United States Patent
Yum et al.

(10) Patent No.: US 9,778,849 B2
(45) Date of Patent: Oct. 3, 2017

(54) METHOD OF OPERATING DATA STORAGE DEVICE USING SIZE AND WRITE SPEED INFORMATION AND METHOD OF OPERATING SYSTEM INCLUDING THE SAME

(71) Applicant: SAMSUNG ELECTRONICS CO., LTD., Suwon-si, Gyeonggi-do (KR)

(72) Inventors: Ho Suk Yum, Hwaseong-si (KR); Jin Wan Jun, Seoul (KR); Chong Hyun Lee, Seoul (KR); Dong Hyuk Ihm, Hwaseong-si (KR); Jin Hyuk Kim, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 283 days.

(21) Appl. No.: 14/659,685

(22) Filed: Mar. 17, 2015

(65) Prior Publication Data
US 2015/0268860 A1    Sep. 24, 2015

(30) Foreign Application Priority Data
Mar. 24, 2014    (KR) .................. 10-2014-0033958

(51) Int. Cl.
*G06F 12/00* (2006.01)
*G06F 3/06* (2006.01)
*G06F 12/02* (2006.01)

(52) U.S. Cl.
CPC .............. *G06F 3/061* (2013.01); *G06F 3/064* (2013.01); *G06F 3/0659* (2013.01); *G06F 3/0673* (2013.01); *G06F 3/0679* (2013.01); *G06F 12/00* (2013.01); *G06F 3/0611* (2013.01); *G06F 12/0246* (2013.01); *G06F 2212/1024* (2013.01)

(58) Field of Classification Search
CPC .... G06F 12/0246; G06F 3/061; G06F 3/0659; G06F 3/0673; G06F 3/0679; G06F 3/0611; G06F 3/064; G06F 2212/1024
USPC .................................... 711/103; 365/189.011
See application file for complete search history.

(56) References Cited

U.S. PATENT DOCUMENTS

| | | | |
|---|---|---|---|
| 6,295,409 B1 * | 9/2001 | Ikeda | G11B 20/10527 386/327 |
| 6,809,962 B2 | 10/2004 | Uribe et al. | |
| 7,562,181 B2 | 7/2009 | Sinclair et al. | |
| 7,689,761 B2 | 3/2010 | Yim et al. | |
| 8,543,758 B2 | 9/2013 | Larson et al. | |
| 2007/0019315 A1 * | 1/2007 | Tamura | G06F 3/0611 360/8 |

(Continued)

FOREIGN PATENT DOCUMENTS

| | | |
|---|---|---|
| JP | 2000-184006 | 6/2000 |
| KR | 1020080009314 | 1/2008 |

(Continued)

*Primary Examiner* — Mardochee Chery
(74) *Attorney, Agent, or Firm* — F. Chau & Associates, LLC

(57) ABSTRACT

A method of operating a data storage device is provided. Size information of write data and write speed information is received from a host. A first write area is determined to store the write data based on the size information and the write speed information. The write data is received from the host. The write data is written to the first write area using at least one method selected among a plurality of write methods according to the write speed information.

20 Claims, 9 Drawing Sheets

(56) References Cited

U.S. PATENT DOCUMENTS

| | | | |
|---|---|---|---|
| 2012/0159051 A1 | 6/2012 | Hida et al. | |
| 2012/0290769 A1* | 11/2012 | Okubo | G06F 12/0246 711/103 |
| 2013/0007566 A1 | 1/2013 | Shalvi et al. | |
| 2013/0114354 A1* | 5/2013 | Ryu | G11C 11/5628 365/189.011 |
| 2013/0132648 A1 | 5/2013 | Choi et al. | |
| 2013/0173843 A1 | 7/2013 | Balakrishnan et al. | |
| 2013/0282959 A1 | 10/2013 | Chu | |
| 2014/0089568 A1* | 3/2014 | Chung | G06F 12/0246 711/103 |

FOREIGN PATENT DOCUMENTS

| | | |
|---|---|---|
| KR | 1020130032603 | 4/2013 |
| KR | 1020130143140 | 12/2013 |

* cited by examiner

METHOD OF OPERATING DATA STORAGE DEVICE USING SIZE AND WRITE SPEED INFORMATION AND METHOD OF OPERATING SYSTEM INCLUDING THE SAME

CROSS-REFERENCE TO RELATED APPLICATION

This application claims priority under 35 U.S.C. §119 to Korean Patent Application No. 10-2014-0033958, filed on Mar. 24, 2014 in the Korean Intellectual Property Office, the disclosure of which is incorporated by reference in its entirety.

TECHNICAL FIELD

The present inventive concept relates to a method of writing data to a data storage device using at least one of write methods according to write speed information transmitted from a host to the data storage device.

DISCUSSION OF RELATED ART

Flash memory may write in a burst mode, where a predetermined amount of data in blocks is written to the flash memory at a fixed speed. In the burst mode operation performed by the flash memory, a host does not change the fixed speed of the burst mode operation.

SUMMARY

According to an exemplary embodiment of the present inventive concept, a method of operating a data storage device is provided. Size information of write data and write speed information is received from a host. A first write area is determined to store the write data based on the size information and the write speed information. The write data is received from the host. The write data is written to the first write area using at least one method selected among a plurality of write methods according to the write speed information.

According to an exemplary embodiment of the present inventive concept, a method of operating a data processing system including a host and a data storage device is provided. The data storage device receives size information of write data and write speed information from the host. The data storage device determines a first write area to store the write data based on the size information and the write speed information. The data storage device receives the write data from the host. The data storage device writes the write data to the first write area using at least one method selected among a plurality of write methods according to the write speed information.

According to an exemplary embodiment of the present inventive concept, a method of operating a data storage device is provided. Area allocation information is received from a host. A write area is allocated based on the area allocation information. Write data is received from the host. The write data is written to the write area at a write speed requested by the host.

According to an exemplary embodiment of the present inventive concept, a method of operating a data processing system is provided. The data processing system includes a host and a data storage device including a memory space which is formed of a plurality of multi-level memory cells. The host sends memory allocation information for a data to be written. The memory allocation information includes a bandwidth information and a data size information. The data storage device calculates a data size necessary to store the data using the data size information. The host detects an available memory space of the memory space to write the data. The host determines according to a detection result of the detecting of the available memory space whether performing a write operation on the available memory space according to the bandwidth information or performing a background operation on the memory space to secure more available memory space to perform a write operation.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF EXEMPLARY EMBODIMENTS

Figure 1:
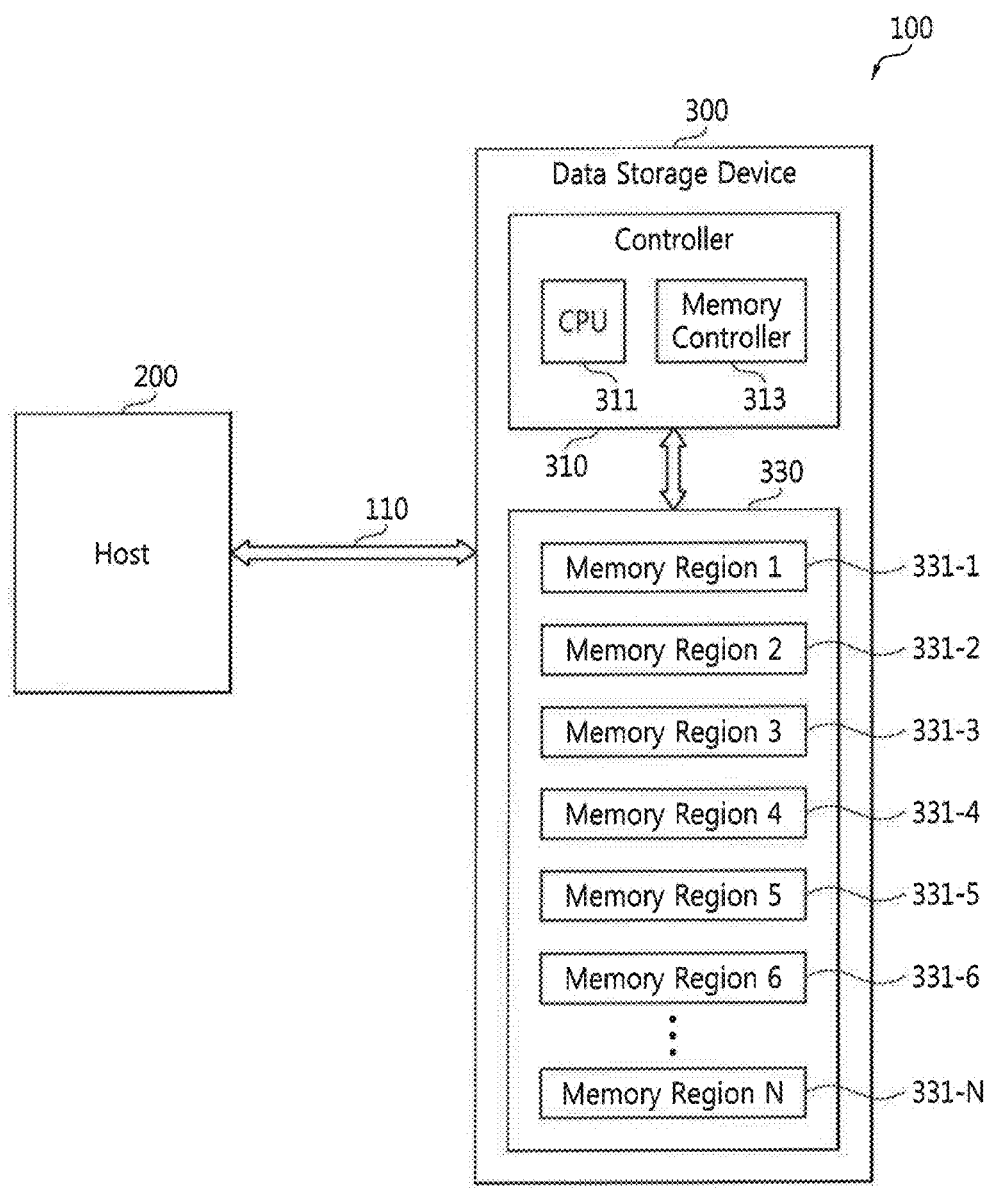
FIG. 1 is a block diagram of a data processing system according to an exemplary embodiment of the inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

FIG. 1 is a block diagram of a data processing system 100 according to an exemplary embodiment of the inventive concept. The data processing system 100 includes a host 200 and a data storage device 300. The host 200 and the data storage device 300 may communicate commands and data with each other via an interface 110.

The data processing system 100 may be implemented as a personal computer (PC), a data server, or a portable electronic device. The portable electronic device may be implemented as a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The host 200 may control the operation of the data storage device 300. For example, the host 200 may transmit area allocation information to the data storage device 300 for securing a write area allowing write data to be stored at a write speed set by the host 200 in the data storage device 300 and may control a background operation on the data storage device 300 based on information about an available memory space to secure the write data. The information about an available memory space may be received from the data storage device 300. The host 200 may transmit a command to the data storage device 300 or adjust an idle time of the data storage device 300 to secure the write area.

For example, when the write area is not sufficient, the data storage device 300 may increase the write area in response to a command from the host 200 in an exemplary embodiment. Alternatively, the data storage device 300 may increase the write area during an idle time. For example, when no commands are received from the host 200 for the idle time, the data storage device 300 may internally perform an operation without intervention of the host 200. The host 200 may determine the idle time. The host 200 may be implemented as an integrated circuit (IC), a system on chip (SoC), an application processor (AP), or a mobile AP.

The host 200 may transmit write data, size information indicating to the size of the write data and write speed information indicating to the speed at which the write data is written to the data storage device 300. The area allocation information may include the size information and the write speed information.

The data storage device 300 may be implemented as a flash-based memory device. The flash-based memory device may be implemented as a multimedia card (MMC), an embedded MMC (eMMC), a universal flash storage (UFS), or a solid state drive (SSD). The data storage device 300 may include a controller 310 and a memory 330. The controller 310 may communicate commands and data with the host 200 via the interface 110 and may also communicate commands and data with the memory 330.

The controller 310 includes a central processing unit (CPU) 311 and a memory controller 313. The CPU 311 may control the operation of the memory controller 313 in response to a command outputted from the host 200. The memory controller 313 may control operations on the memory 330 according to the control of the CPU 311. The operations may include a write operation (or a program operation), a read operation, an erase operation, and a background operation. Here, the background operation may include a garbage collection operation to secure memory space for a program operation.

The memory 330 includes a plurality of memory regions 331-1 through 331-N where N is a natural number. The memory regions 331-1 through 331-N may include a plurality of multi-level cells (MLCs). The MLCs are memory elements that are capable of storing information of at least two bits per cell.

Memory regions at both edges may be implemented as single-level cell (SLC) memory regions. The SLC memory regions may be implemented functionally. For example, if the memory controller 313 performs an SLC write method on part of the memory regions, the part of the memory regions may be referred to as an SLC memory region. The memory regions are formed of multi-level memory cells. Accordingly, when data is written to the functionally implemented SLC memory region, an SLC write method may be used.

Each of the memory regions 331-1 through 331-N illustrated in FIG. 1 may denote a page or block or may denote a plurality of pages or blocks. The write and read operations are performed in a page unit, and the erase operation is performed in a block unit. Each block includes a plurality of pages.

Figure 4:
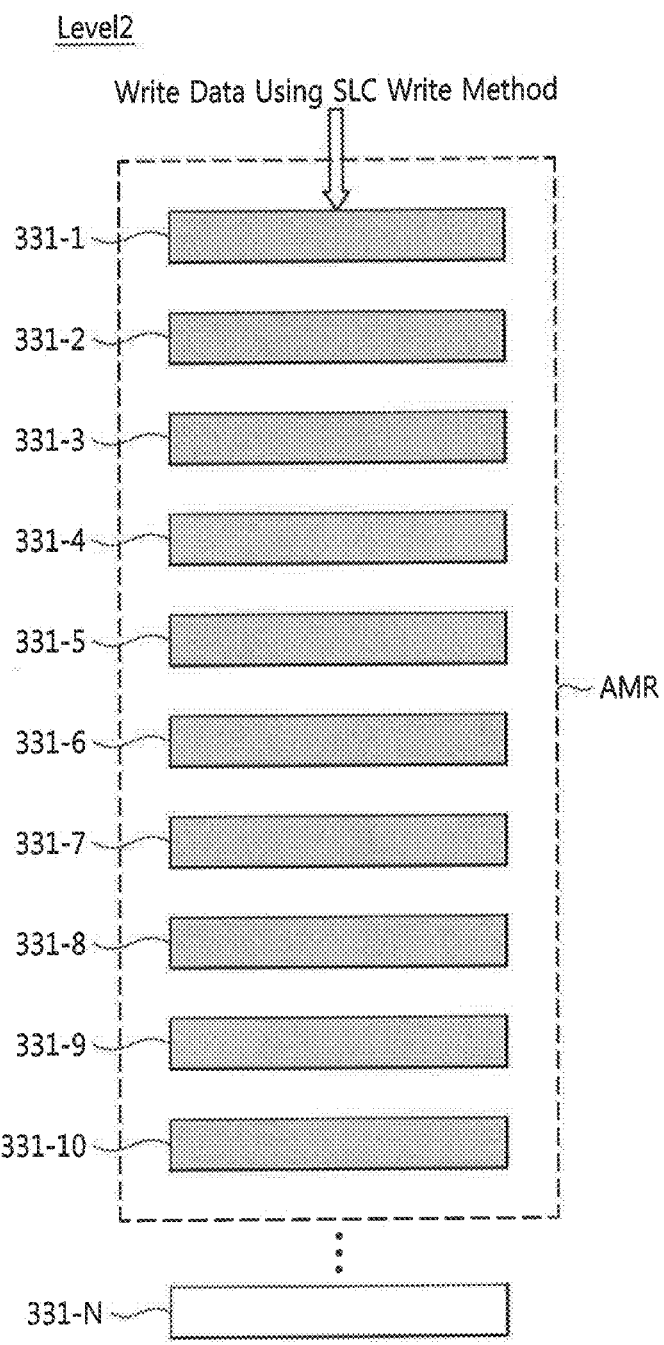
FIG. 4 is a diagram of a write method corresponding to write speed information according to an exemplary embodiment of the inventive concept.
Figure 5:
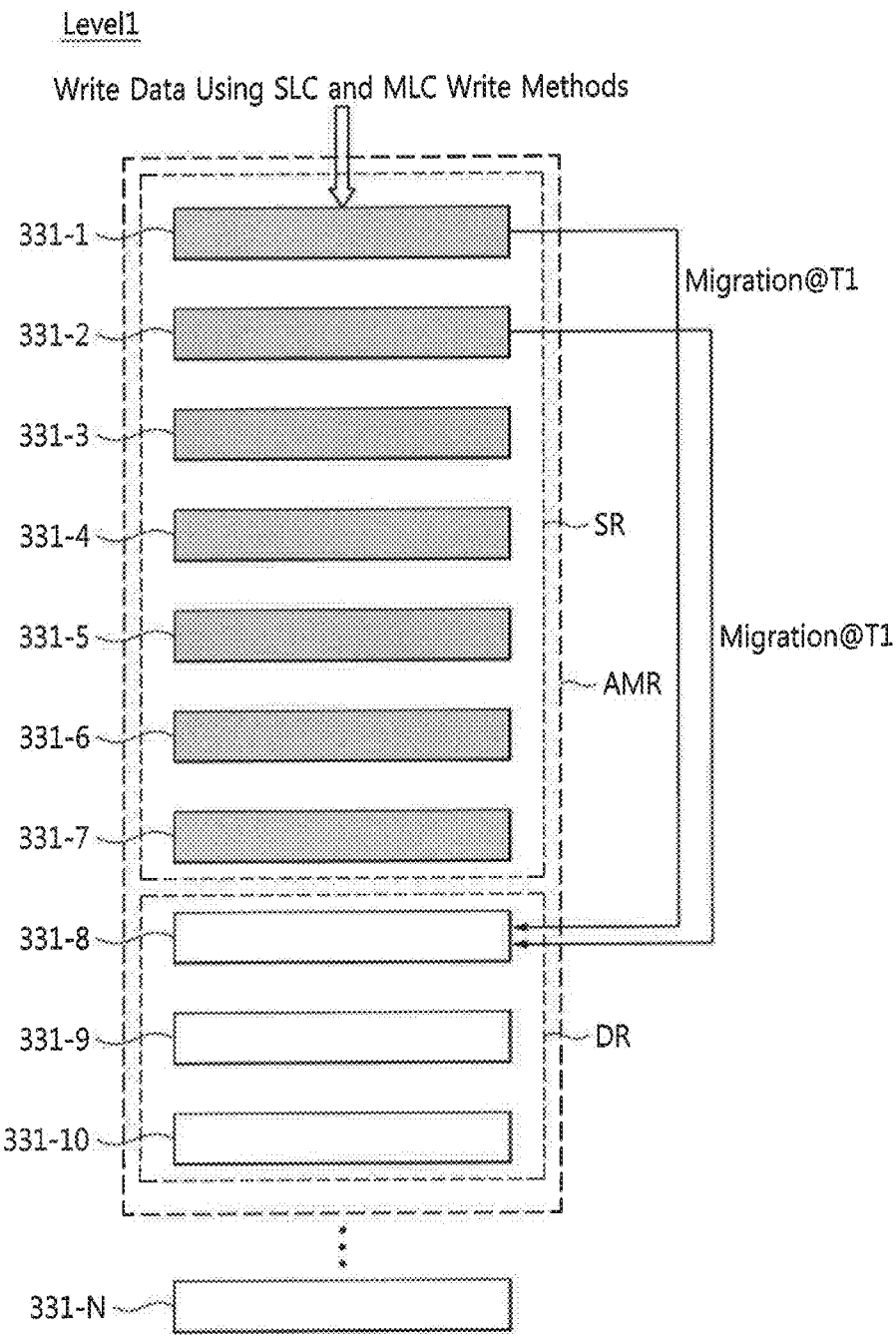
FIG. 5 is a diagram of a write method corresponding to write speed information according to an exemplary embodiment of the inventive concept.

A write area according to an exemplary embodiment of the inventive concept includes at least one memory region in which write data outputted from the host 200 is stored at a write speed requested by the host 200. Accordingly, the write area may be determined based on area allocation information, e.g., write data size and write speed. The write area may be formed of an SLC memory region, an MLC memory region or a combination thereof. For example, the write area may be formed of an SLC memory region only, as shown in FIG. 4, and the write area may be formed of a combination of an SLC memory region and an MLC memory region, as shown in FIG. 5.

Accordingly, if the write speed requested by the host 200 increases, more SLC write operation is performed. In this case, the ratio of the SLC memory region increases with respect to the MLC memory region. The write speed may correspond to a bit rate at which data is transmitted from the host 200 to the data storage device 300 via the interface 110 or may be a speed at which write data is actually written to the write area.

Figure 3:
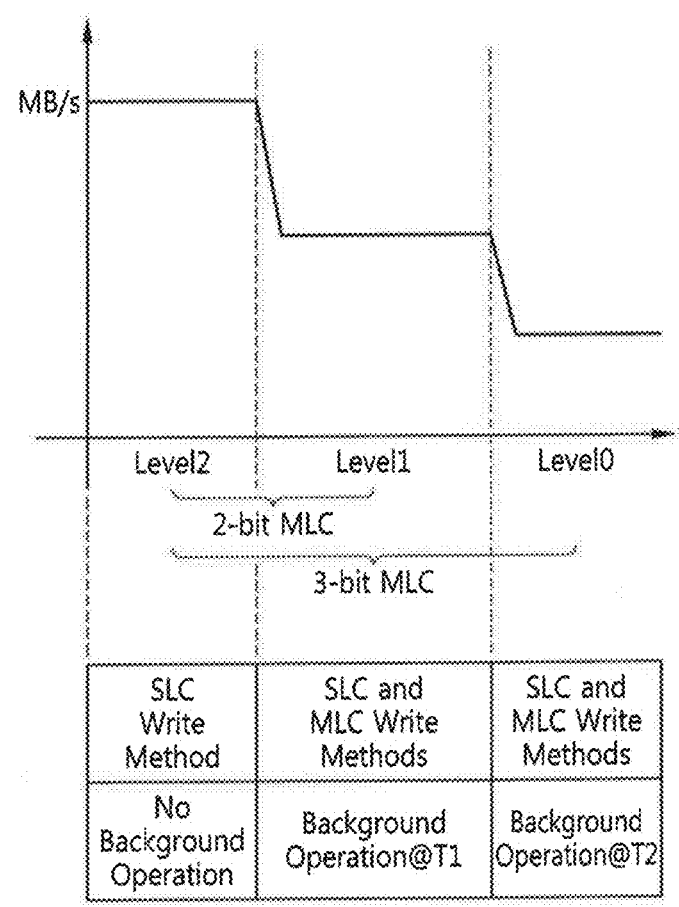
FIG. 3 is a diagram of write speed information according to an exemplary embodiment of the inventive concept.

A write speed of an SLC memory region is faster than that of an MLC memory region. Accordingly, the memory controller 313 appropriately allocates the size of the SLC memory region and the size of the MLC memory region of the write area so that the write speed requested by the host 200 is achieved. For example, the write speed may be achieved by appropriately allocating the SLC memory region size and the MLC memory region size in the write area. In addition, the write speed may also be determined by a background operation time, e.g., a time while garbage collection is performed, as shown in FIG. 3.

Figure 2:
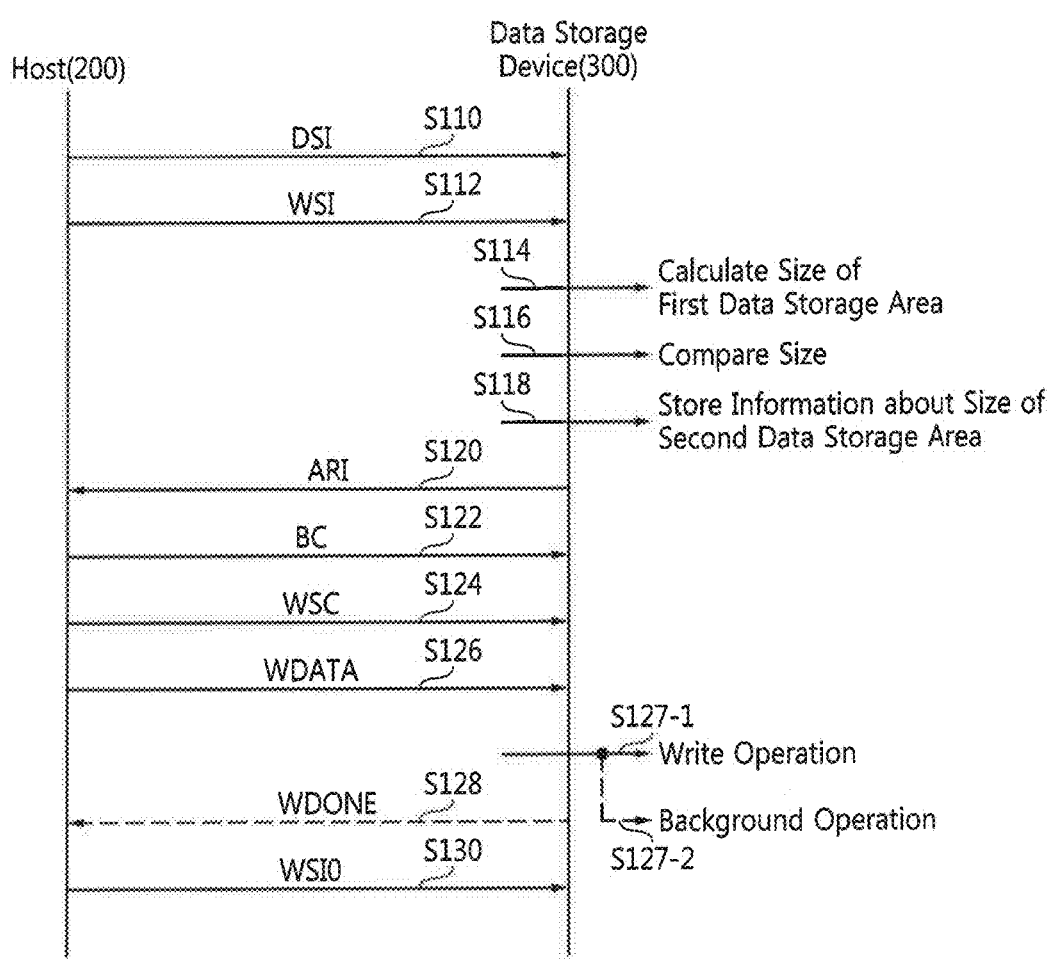
FIG. 2 is a diagram of a data flow for showing operations of the data processing system of FIG. 1 according to an exemplary embodiment of the inventive concept.
Figure 6:
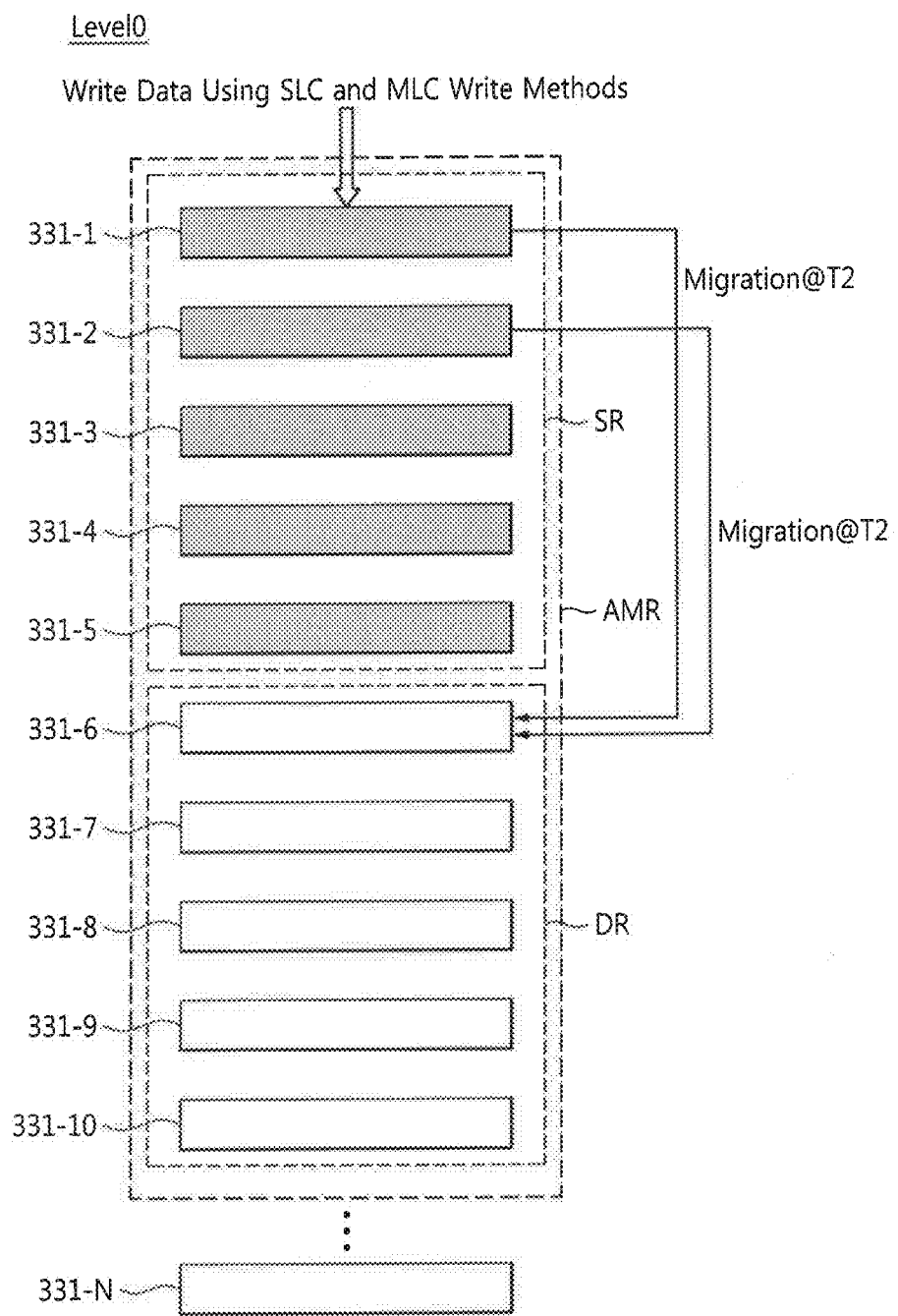
FIG. 6 is a diagram of a write method corresponding to write speed information according to an exemplary embodiment of the inventive concept.

FIG. 2 is a diagram of a data flow for showing operations of the data processing system 100 of FIG. 1 according to an exemplary embodiment of the inventive concept. FIG. 3 is a diagram of operations corresponding to write speed information according to an exemplary embodiment of the inventive concept. FIGS. 4 through 6 are diagrams of a write method corresponding to the write speed information according to an exemplary embodiment of the inventive concept.

JESD84-B50, i.e., eMMC electrical standard (version 5.0) issued by Joint Electron Devices Engineering Council (JEDEC) in September 2013 is hereby incorporated by reference. Accordingly, terms and definitions disclosed in JESD84-B50 are used in this specification.

Referring to FIGS. 1 through 6, the host 200 may transmit a command including write data size information DSI to the data storage device 300 in operation S110. The size information DSI is determined by the host 200. The size information DSI includes a size information indicating to the size of write data to be written to the data storage device 300 in response to a request by the host 200. For example, if the size information DSI is 8 bits in length, the size information DSI indicates to the size of write data up to 2.56 Gbytes. In this case, each unit decimal value of the size information DSI represents 10 Mbytes in size. The present inventive concept is not limited thereto, and the unit decimal value of the size information DSI may represent different values. When the data storage device 300 is an eMMC, the size information DSI may be included in a CMD6 argument.

The host 200 may transmit a command including write speed information WSI to the data storage device 300 in operation S112. When the data storage device 300 is an eMMC, the write speed information WSI may be included in the CMD6 argument.

The host 200 may determine the write speed information WSI indicating to a write speed, e.g., megabytes per second (MB/s), at which write data is written to the memory 330. The write speed information WSI may indicate to a bandwidth level. As described above, the write speed information WSI may indicate a bit rate of the write data transmitted via the interface 110 or a speed at which the write data is actually written to the write area. For example, if the write speed information WSI indicates to one of three write speeds Level 1 to Level 3, as shown in FIG. 3, the write speed information WSI may have two-bit information to express the three write speeds. Alternatively, if the write speed information WSI indicates to one of two write speeds (or two levels), the write speed information WSI may have one-bit information.

The host 200 may transmit the command including the write speed information WSI to the data storage device 300 prior to the command including the size information DSI. Alternatively, the host 200 may transmit a command including both the size information DSI and the write speed information WSI to the data storage device 300. When the data storage device 300 is an eMMC, the size information DSI and the write speed information WSI may be included in the CMD6 argument.

The CPU 311 may calculate a size of the write area (or a size of a first data storage area) using the size information DSI and the write speed information WSI in operation S114. The size of the first data storage area indicates the size of the write area to which the write data will be stored according to the write speed requested by the host 200. The allocation of write area may be changed according to the write speed. Hereinafter, such allocation will be described with reference to FIGS. 3-6.

Referring to FIG. 3, the host 200 has a first write speed Level 1 and a second write speed Level 2 for a memory cell that is capable of storing 2-bit data per cell, and the host 200 has, in addition to the first and second write speeds Level 1 and Level 2, a third write speed Level 3 for a memory cell that is capable of storing 3-bit data per cell. At the first write speed of Level 1, the write area is allocated to an SLC memory region only on which an SLC write method is performed.

At the second write speed of Level 2, the write area is allocated to a combination of an SLC memory region and an MLC memory region. The SLC and MLC memory regions are formed of memory cells of which each cell is capable of two-bit data per a memory cell. In this case, the host 200 may set one of the first and the second write speed Level 1 and Level 2 as a write speed. An SLC write method is performed on the SLC memory region, and an MLC write method is performed on the MLC memory region.

At the third speed of Level 3, the write area is allocated with an SLC memory region and an MLC memory region. The SLC and MLC memory regions are formed of memory cells of which each memory cell is capable of three-bit data per a memory cell. In this case, the host 200 may set one of the first, the second and the third write speed Level 1, Level 2 and Level 3 as a write speed. Alternatively, the host 200 may set one of the first and the third write speed Level 1 and Level 3 as a write speed. An SLC write method is performed on the SLC memory region, and a triple level cell (TLC) write method is performed on the MLC memory region.

Among the three write speeds Level 1, Level 2 and Level 3, the first write speed of Level 1 is the fastest one and the third write speed of Level 3 is the slowest one. For the convenience of description, the first write speed Level 1 corresponds to a bit rate of 25 MB/s; the second write speed Level 2 corresponds to a bit rate of 12 MB/s; the third write speed Level 3 corresponds to a bit rate of 6 MB/s.

With reference to FIGS. 3 and 4, a write operation having the first write speed Level 1 will be described. The memory controller 310 operates the memory 300 at the first write speed Level 1 according to the write speed information WSI. The memory controller allocates an available memory space as an SLC memory region. For example, the available memory space includes memory regions 331-1 through 331-10 of which each has 20 Mbytes in size. If the size of data to be written is 100 Mbytes according to the size information DSI and if the write speed information WSI corresponds to the first write speed of Level 1, the available memory space 331-1 through 331-N is allocated as an SLC memory region. In this case, the write data of 100 Mbytes can be written to the memory 330 within a first write time (e.g., 9 seconds). The data stored in the SLC memory region is temporarily stored, and it will be later stored using an MLC write method.

For example, the CPU 311 may allocate ten memory regions 331-1 through 331-10 for the first data storage area AMR to enable all of the write data WDATA to be written using an SLC write method. Each of the memory regions 331-1 through 331-10 may store data of 10 Mbytes.

With reference to FIGS. 3 and 5, a write operation have the second write speed Level 2 will be described. The memory controller 310 operates the memory 300 at the second write speed Level 2 according to the write speed information WSI. The memory controller allocates an available memory space as an SLC memory region and as an MLC memory region. For example, the available memory space includes memory regions 331-1 through 331-10 of which each memory region has 20 Mbytes in size. If the size of data to be written is 100 Mbytes according to the size information DSI and if the write speed information WSI corresponds to the second write speed Level 2, the available memory space 331-1 through 331-4 is allocated as an SLC memory region, and the available memory space 331-5 to 331-7 is allocated as an MLC memory region. In this case, the write data of 100 Mbytes can be written to the memory 330 within a second write time (e.g., 9 seconds). The data stored in the SLC memory region 331-1 and 331-2 are migrated to the available memory space 331-8 using an MLC write method. Similarly, the data stored in the SLC memory region 331-3 and 331-4 are migrated to the available memory space 331-9 using an MLC write method. Such migration operation S127-2 may be performed while the MLC write method S127-1 is performed on the MLC memory regions 331-5, 331-6 and 331-7.

For example, the CPU 311 may allocate the memory regions 331-1 through 331-4 for writing some of the write data WDATA using the SLC write method and allocate the memory regions 331-5 through 331-7 for writing the rest of the write data WDATA using a 2-bit MLC write method. For example, each of the memory regions 331-1 through 331-4 may store data of 10 Mbytes and each of the memory regions 331-5 through 331-7 may store 20 Mbytes. For example, the CPU 311 may determine the size of the first data storage area AMR so that all of the write data WDATA can be written to the first data storage area AMR within the second write time (e.g., 9 seconds) determined according to the data size (e.g., 100 Mbytes) corresponding to the size information DSI and the second write speed (e.g., level 1 of 12 MB/s) corresponding to the write speed information WSI. The second write time (e.g., 9 seconds) includes a background operation (e.g., garbage collection) time.

Hereinafter, it will be described that a write method according to the write speed information WSI is performed on the memory regions 331-1 to 331-N having a memory cell that is capable of three-bit data per a memory cell.

With reference to FIGS. 3 and 4, a write operation having the first write speed Level 1 operation will be described. The memory controller 310 operates the memory 300 at the first write speed Level 1 according to the write speed information WSI. The memory controller allocates an available memory space as an SLC memory region. For example, the available memory space includes memory regions 331-1 through 331-10 of which each memory region has 30 Mbytes in size. Each memory cell of the memory region 331-1 through 331-10 is capable of storing three-bit data per a memory cell. If the size of data to be written is 100 Mbytes according to the size information DSI and if the write speed information WSI corresponds to the first write speed of Level 1, the available memory space 331-1 through 331-10 is allocated as an SLC memory region. In this case, the write data of 100 Mbytes can be written to the memory 330 within a first write time (e.g., 4 seconds).

For example, the CPU 311 may allocate ten memory regions 331-1 through 331-10 for the first data storage area AMR to enable the write data WDATA to be written using the SLC write method. Each of the memory regions 331-1 through 331-10 may store data of 10 Mbytes.

With reference to FIGS. 3 and 5, a write operation having the second write speed Level 2 operation will be described. The memory controller 310 operates the memory 300 at the second write speed Level 2 according to the write speed information WSI. The memory controller allocates an available memory space as an SLC memory region and as an MLC memory region. For example, the available memory space includes memory regions 331-1 through 331-10 of which each memory region has 30 Mbytes in size. Each memory cell of the available memory space is capable of storing three-bit data per a memory cell. If the size of data to be written is 100 Mbytes according to the size information DSI and if the write speed information WSI corresponds to the second write speed Level 2, the available memory space 331-1 through 331-5 is allocated as an SLC memory region, and the available memory space 331-6 to 331-7 is allocated as an MLC memory region. In this case, the write data of 100 Mbytes can be written to the memory 330 within a second write time (e.g., 9 seconds).

For example, the CPU 311 may allocate the memory regions 331-1 through 331-5 for writing some of the write data WDATA using the SLC write method and allocate the memory regions 331-6 and 331-7 for writing the rest of the write data WDATA using a 3-bit MLC write method. Each of the memory regions 331-1 through 331-5 may store data of 10 Mbytes, the memory region 331-6 may store data of 30 Mbytes, and the memory region 331-7 may store 20 Mbytes.

With reference to FIGS. 3 and 6, a write operation having the third write speed Level 3 will be described. The memory controller 310 operates the memory 300 at the third write speed Level 3 according to the write speed information WSI. The memory controller allocates an available memory space as an SLC memory region and as an MLC memory region. For example, the available memory space includes memory regions 331-1 through 331-10 of which each has 30 Mbytes in size. Each memory cell of the available memory space is capable of storing three-bit data per a memory cell. If the size of data to be written is 100 Mbytes according to the size information DSI and the write speed information WSI corresponds to the second write speed of Level 3, the available memory space 331-1 through 331-2 is allocated as an SLC memory region, and the available memory space 331-3 to 331-5 is allocated as an MLC memory region. In this case, the write data of 100 Mbytes can be written to the memory 330 within a third write time (e.g., 17 seconds).

The data stored in the SLC memory region 331-1 and 331-2 are migrated to the available memory space 331-6 using an MLC write method for a second migration time T2. Such migration operation S127-2 may be performed while the MLC write method S127-1 is performed on the MLC memory regions 331-3, 331-4 and 331-5.

For example, the CPU 311 may allocate the memory regions 331-1 and 331-2 for writing some of the write data WDATA using the SLC write method and allocate the memory regions 331-3 through 331-5 for writing the rest of the write data WDATA using the 3-bit MLC write method. Each of the memory regions 331-1 and 331-2 may store data of 10 Mbytes, each of the memory regions 331-3 and 331-4 may store data of 30 Mbytes, and the memory region 331-5 may store 20 Mbytes.

With reference to FIGS. 4 through 6, the write area allocation of the first data storage area AMR was described according to an exemplary embodiment. As described above, the CPU 311 may calculate the size of the write area which enables the write data WDATA to be stored in the data storage device 300 at a write speed or within a write time corresponding to the write speed information WSI provided by the host 200. At this time, the CPU 311 may calculate the size of the write area taking a background operation to be performed in the write area AMR into account and determine the write area AMR according to the calculation result. In this case, the CPU 311 may allocate a memory space smaller than the size of the write data WDATA to be received from the host 200 for the write area AMR taking the background operation to be performed in the memory 330 into account. For example, the background operation may include a garbage collection operation.

The CPU 311 calculate the size of an available memory space (or a second data storage area) in the memory 330 and compares the size of the write area with that of the available memory space (the second data storage area) in operation S116. The size of the first data storage area is the size of a data storage area requested by the host 200, and the size of the second data storage area is the size of a data storage area that the data storage device 300 has for a write operation requested from the host.

When the size of the second data storage area is greater than the size of the first data storage area, the CPU 311 stores information ARI about the size of the second data storage area in a register in operation S118. The register may be an Ext. CSD register. The operation of the data processing system 100 when the size of the second data storage area is smaller than the size of the first data storage area will be described in detail with reference to FIG. 7 later.

The host 200 reads the second data storage area size information ARI from the register (e.g., Ext. CSD register) using a command (e.g., CMD8) in operation S120. For example, the CPU 311 transmits the second data storage area size information ARI stored in the register (e.g., Ext. CSD register) to the host 200 in response to a command (e.g., CMD8) output from the host 200 in operation S120.

The host 200 transmits size information BC of the write data WDATA to the data storage device 300 in response to the second data storage area size information ARI in operation S122. For example, the host 200 may transmit a block count corresponding to the size of the write data WDATA to the data storage device 300 in operation S122. The size information BC of the write data WDATA may be included in CMD23. The size information DSI may be the same as the size information BC.

The host 200 may transmit a write start command WSC to the data storage device 300 in operation S124. The write start command WSC may be included in CMD23. The host 200 may transmit the write data WDATA to the data storage device 300 in operation S126.

For example, when the memory cells are 3-bit MLCs and the write speed information WSI indicates to the first write speed Level 1, the data storage device 300 may write the write data WDATA to the write area AMR using the SLC write method within the first write time (e.g., 4 seconds) in operation S127-1. At this time, the data storage device 300 does not perform a background operation, e.g., garbage collection, thereby maximizing a write speed.

When the memory cells are 3-bit MLCs and the write speed information WSI indicates the second write speed Level 2, the data storage device 300 writes the write data WDATA to the write area AMR within the second write time (e.g., 9 seconds). Therefore, the data storage device 300 may write the write data WDATA to the write area AMR using the 2-bit MLC write method in operation S127-1.

While performing the write operation in operation S127-1, the data storage device 300 may also perform a background operation, e.g., garbage collection, in operation S127-2. In addition, the data storage device 300 may perform a migration operation or a copy-back operation to move part of the write data WDATA stored in a source region SR of the write area AMR to a destination region DR of the write area AMR during a first migration time T1. The source region SR and the destination region DR is within the write area AMR. Alternatively, the destination region DR may be assigned outside the write area AMR.

For example, if the memory cells are 3-bit MLCs and the write speed information WSI indicates level 2, the data storage device 300 performs the background operation while performing the write operation, and therefore, the host 200 does not need either to output a command for the background operation to the data storage device 300 or to give an idle time for the background operation to the data storage device 300.

When the memory cells are 3-bit MLCs and the write speed information WSI indicates level 3, the data storage device 300 writes the write data WDATA to the write area AMR within the third write time (e.g., 17 seconds). Therefore, the data storage device 300 may write the write data WDATA to the write area AMR using the 2-bit MLC write method in operation S127-1.

While performing the write operation in operation S127-1, the data storage device 300 may also perform a background operation, e.g., garbage collection, in operation S127-2. In addition, the data storage device 300 may perform a migration operation or a copy-back operation to move part of the write data WDATA stored in the source region SR of the write area AMR to the destination region DR of the write area AMR, during a second migration time T2. In this case, the destination region DR is part of the write area AMR. However, the inventive concept is not limited thereto. For example, the destination region DR may be assigned or located outside the write area AMR. The second migration time T2 may be set longer than the first migration time T1.

Consequently, the data storage device 300 may store or write the write data WDATA to the write area AMR according to at least one method among a plurality of write methods selected based on the write speed information WSI. As described above, the write methods may include the SLC write method and the MLC write methods.

When the memory cells are 2-bit MLCs, the data storage device 300 may write the write data WDATA to the write area AMR illustrated in FIG. 4 at the first write speed Level 1 and may also write the write data WDATA to the write area AMR illustrated in FIG. 5 at the second write speed Level 2. When completing the write operation on the write area AMR, the data storage device 300 transmits an indication signal WDONE indicating the completion of the write operation to the host 200 in operation S128.

The host 200 transmits an initialization command WSIO to the data storage device 300 in response to the indication signal WDONE in operation S130. The initialization command WSIO may be CMD6 and it may command to initialize the write speed information WSI. The data storage device 300 may initialize the register, e.g., the Ext. CSD register, in response to the initialization command WSIO. Therefore, the data storage device 300 may operate at the first write speed, i.e., level 0. The first write speed may be determined as a default speed.

Figure 7:
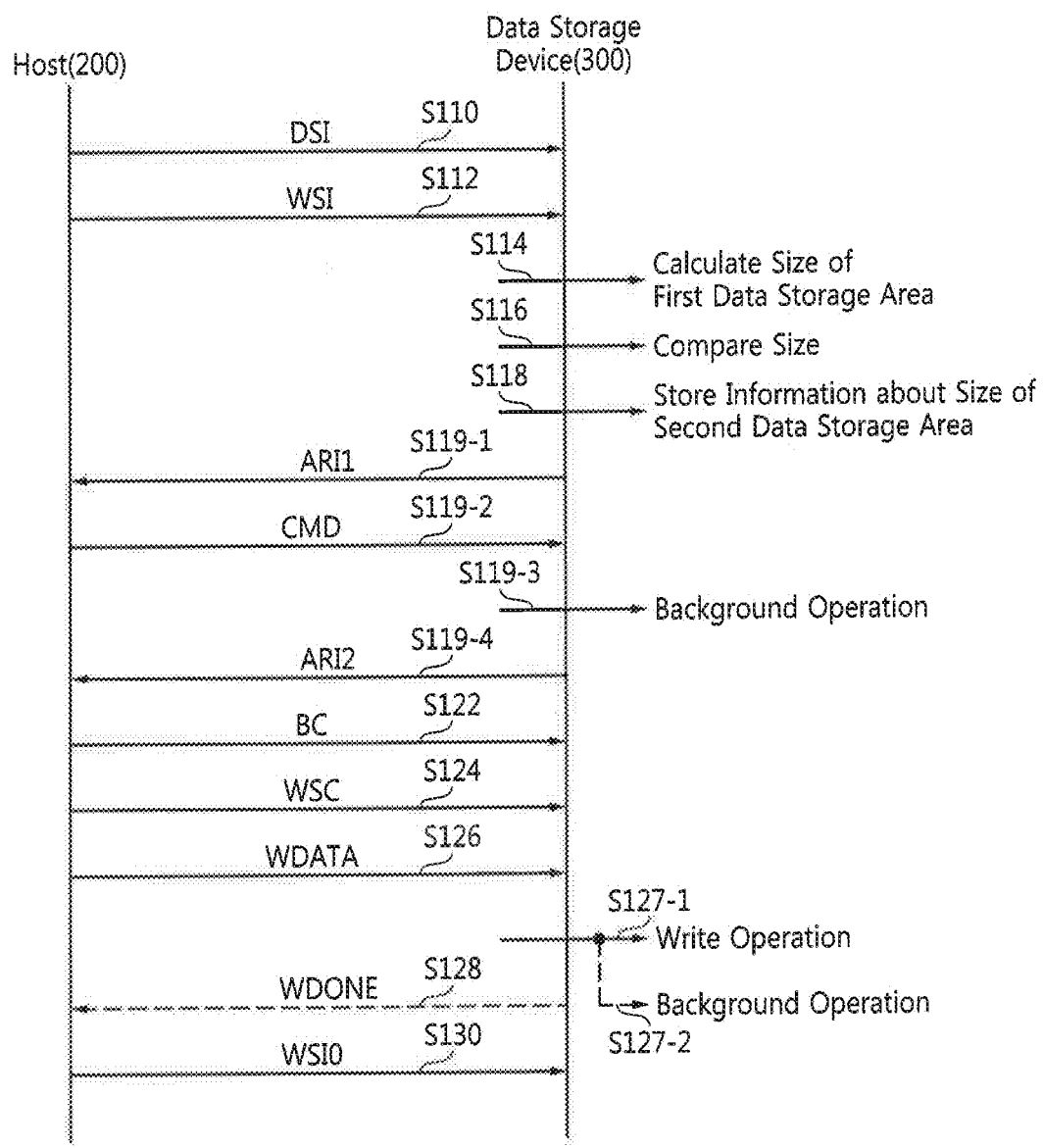
FIG. 7 is a diagram of a data flow for showing operations of the data processing system of FIG. 1 according to an exemplary embodiment of the inventive concept.

FIG. 7 is a diagram of a data flow for showing operations of the data processing system 100 of FIG. 1 according to an exemplary embodiment of the inventive concept. When the size of the second data storage area is smaller than that of the first data storage area (i.e., write area), the data storage device 300 stores information ARI1 about the size of the second data storage area in a register (e.g., an Ext. CSD register) in operation S118.

The host 200 reads the second data storage area size information ARI1 from the register (e.g., Ext. CSD register) using a command (e.g., CMD8) in operation S119-1. For example, the CPU 311 transmits the second data storage area size information ARI1 stored in the register (e.g., Ext. CSD register) to the host 200 in response to a command (e.g., CMD8) output from the host 200 in operation S119-1. The host 200 detects how much more storage area is needed based on the second data storage area size information ARI1 and transmits a command CMD for a background operation to the data storage device 300 according to the detection result in operation S119-2.

The data storage device 300 performs the background operation, e.g., garbage collection, in response to the command CMD in operation S119-3. The data storage device 300 increases the size of the second data storage area through the background operation. The background operation is repeated until the size of the second data storage area is the same as or greater than the size of the first data storage area in operation S119-3. When the first data storage area (i.e., write area) is secured in the data storage device 300 through the background operation, the data storage device 300 stores new second data storage area size information ARI2 in the register (e.g., Ext. CSD register).

The host 200 reads the second data storage area size information ARI2 from the register (e.g., Ext. CSD register) using a command (e.g., CMD8) in operation S119-4. For example, the CPU 311 transmits the second data storage area size information ARI2 stored in the register (e.g., Ext. CSD register) to the host 200 in response to a command (e.g., CMD8) output from the host 200 in operation S119-4. As described above, the data storage device 300 may perform the background operation during an idle time determined by the host 200 without receiving the command CMD for the background operation.

The host 200 transmits the size information BC of the write data WDATA to the data storage device 300 in response to the second data storage area size information ARI2 in operation S122. For example, the host 200 may transmit a block count corresponding to the size of the write data WDATA to the data storage device 300 in operation S122.

Figure 8:
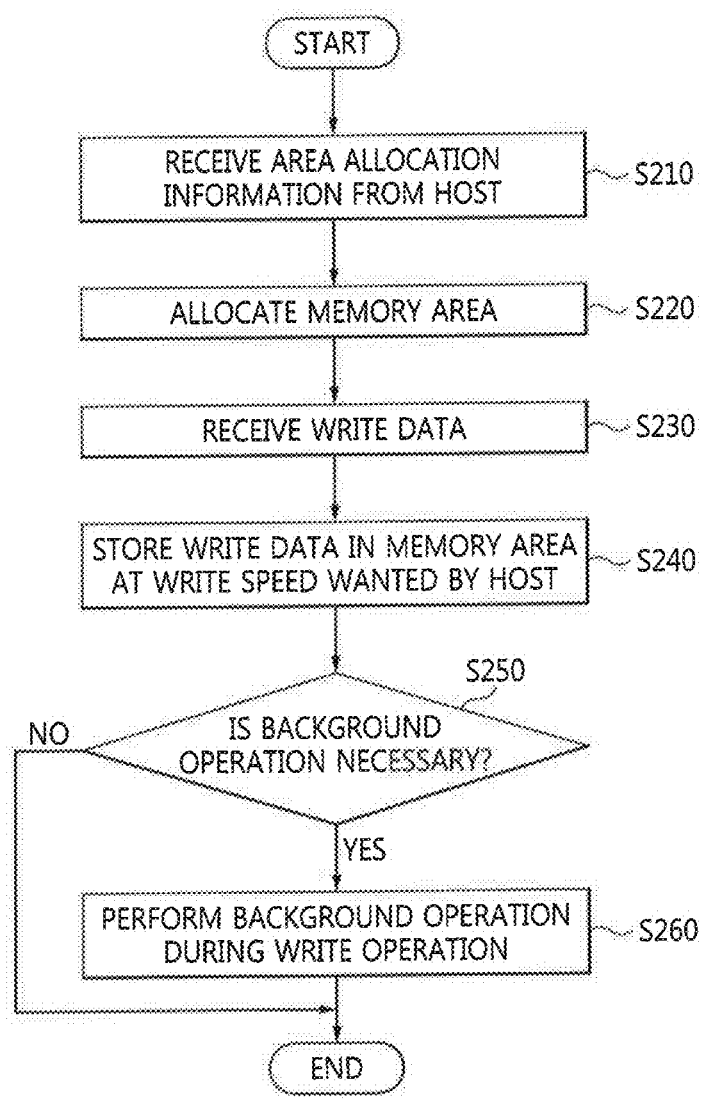
FIG. 8 is a flowchart of a method of operating the data processing system of FIG. 1 according to an exemplary embodiment of the inventive concept.

FIG. 8 is a flowchart of a method of operating the data processing system 100 of FIG. 1 according to an exemplary embodiment of the inventive concept. Referring to FIGS. 1 through 8, the data storage device 300 receives area allocation information from the host 200 in operation S210. The data storage device 300 allocates the write area AMR based on the area allocation information in operation S220. The data storage device 300 receives the write data WDATA from the host 200 in operation S230.

The data storage device 300 writes the write data WDATA to the write area AMR at the write speed of the area allocation information of the host 200 in operation S240. The data storage device 300 may perform a background operation in operations S250 and S260 while the write data WDATA is written to the write area AMR at the second write speed Level 2 or the third write speed Level 3, as shown in FIG. 3. However, the data storage device 300 does not perform the background operation when the write speed is the third write speed Level 1.

According to an exemplary embodiment of the inventive concept, write data is written to a memory of a data storage device at a write speed Level 1 set by a host. Once the host sets the write speed, the data storage device selects at least one of a plurality of write methods to meet the write speed and writes the write data to the memory using the at least one method.

Figure 9:
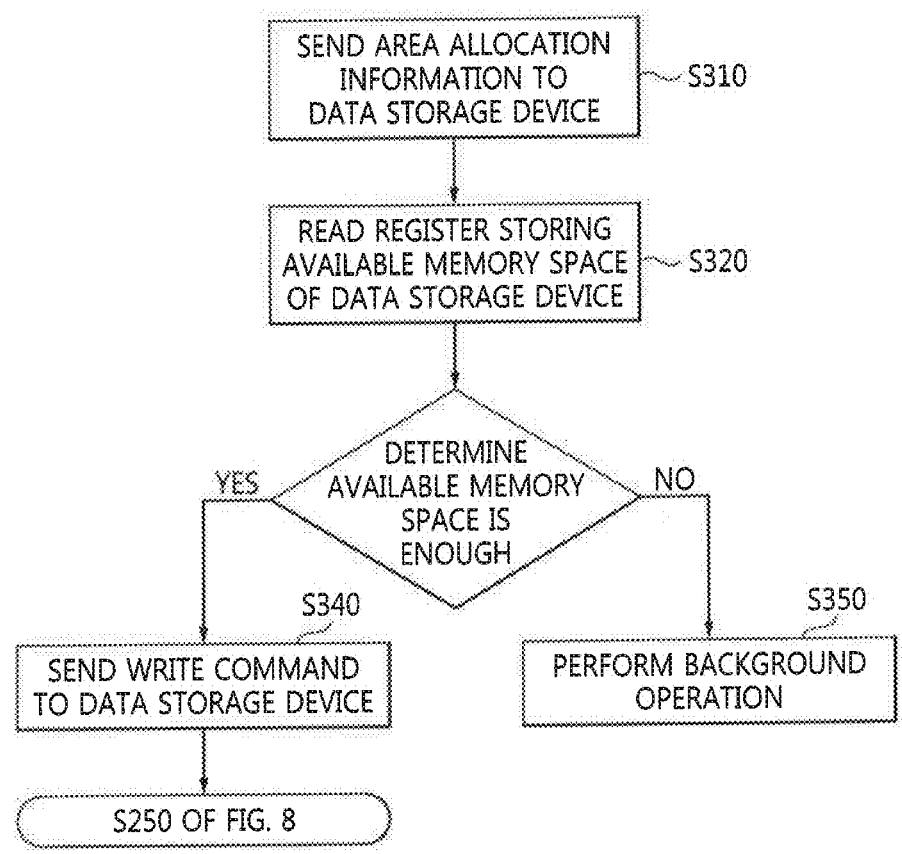
FIG. 9 shows a flowchart of a method of operating the data processing system of FIG. 1 according to an exemplary embodiment of the inventive concept.

FIG. 9 shows a flowchart of a method of operating the data processing system 100 of FIG. 1 according to an exemplary embodiment of the inventive concept. In FIG. 8, it was described how the data storage device 300 operates. In FIG. 9, it will be described how the host 200 operates.

In step S310, the host 300 sends an area allocation information to the data storage device 300. The area allocation information may include data size information DSI and write speed information WSI.

In step S320, the host 300 read the information about an available memory space stored in the register of the data storage device 300. For example, the register may be referred to as Ext. CSD register, if the data storage device 300 is eMMC.

In step S330, the host 300 determines whether the size of the available memory space read from the register is greater than the size of data to be written to the data storage device 300 that is calculated based on the data size information. If the size of the available memory space is greater than the size of data to be written, the operation proceeds to step 340. If the size of the available memory space is smaller than the size of data to be written, the operation proceeds to step 350.

In step 340, the host 200 sends a write command to the data storage device, and then the operation proceeds to step S250 of FIG. 8 so that the data storage device performs a write operation.

In step 350, the host 200 sends a command for a background operation to the data storage device 300 so that the data storage device 300 secure more available memory space. Alternatively, the host 200 may set an idle time so that the data storage device 300 internally performs a background operation without the intervention of the host 200. After completing the background operation, the data storage device 300 updates the register that stores an available memory space.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A method of operating a data storage device, the method comprising:
   receiving size information of write data and write speed information from a host;
   determining a first write area to store the write data based on the size information and the write speed information;
   receiving the write data from the host; and
   writing the write data to the first write area using at least one method selected among a plurality of write methods according to the write speed information,
   wherein the first write area includes a plurality of memory regions, the data storage device determines a write method and a size of each memory region to enable all the write data to be written within a write time corresponding to the write speed information.

2. The method of claim 1, further comprising migrating part of the write data from the first write area to a second write area during a migration time according to the write speed information, wherein the migrating of the part of the write data is performed while the writing of the write data is performed, and wherein the part of the write data is stored in the first write area before the migrating of the part of the write data is performed.

3. The method of claim 2, wherein the migration time is determined according to the write speed information.

4. The method of claim 1, wherein the size information and the write speed information are included in different commands.

5. The method of claim 1, wherein the determining of the first write area comprises securing an available memory space by performing a background operation.

6. The method of claim 5, wherein the background operation is performed in response to a command outputted from the host.

7. The method of claim 5, wherein the background operation is performed during an idle time determined by the host.

8. The method of claim 1, wherein the plurality of write methods comprise a single-level cell write method and at least one multi-level cell write methods.

9. The method of claim 8, wherein the writing of the portion of the write data comprises performing a background operation while a part of the portion of the write data is written to the first write area using the at least one multi-level cell write methods.

10. The method of claim 1, further comprising:
storing information about a size of the first write area in a register after determining the first write area; and
initializing the register in response to an initialization command outputted from the host after the write data is written to the first write area.

11. The method of claim 1, wherein the determining of the first write area comprises:
detecting an available write area in the data storage device based on the size information and the write speed information;
storing the available write area information in a register; transmitting the available write area information to the host in response to a first command outputted from the host; and
performing a background operation for determining the first write area in response to a second command output from the host based on the available write area information.

12. The method of claim 11, wherein the register is an Ext CSD register and the first command is CMD8.

13. The method of claim 1, wherein the determining the first write area comprises:
detecting an available write area in the data storage device based on the size information and the write speed information; storing available write area information in a register of the data storage device;
transmitting the available write area information to the host in response to a first command output from the host; and
performing a background operation for determining the first write area until receiving a second command.

14. A method of operating a data processing system including a host and a data storage device, the method comprising:
receiving, by the data storage device, size information of write data and write speed information from the host;
determining, by the data storage device, a first write area to store the write data based on the size information and the write speed information;
receiving, by the data storage device, the write data from the host; and
writing, by the data storage device, the write data to the first write area using at least one method selected among a plurality of write methods according to the write speed information,
wherein the first write area includes a plurality of memory regions, the data storage device determines a write method and a size of each memory region to enable all the write data to be written within a write time corresponding to the write speed information.

15. The method of claim 14, wherein the writing of the write data comprises performing a background operation while the write data is written to the first write area using the at least one write method.

16. The method of claim 14, wherein the determining of the first write area comprises:
detecting, by the data storage device, an available write area in the data storage device based on the size information and the write speed information;
storing, by the data storage device, available write area information in a register; transmitting, by the data storage device, the available write area information to the host in response to a first command outputted from the host; and
transmitting, by the host, a second command to the data storage device based on the available write area information, and performs, by the data storage device, a background operation for determining the first write area in response to the second command.

17. The method of claim 14, wherein the determining the first write area comprises:
detecting, by the data storage device, an available write area in the data storage device based on the size information and the write speed information;
storing, by the data storage device, available write area information in a register using the data storage device;
transmitting, by the data storage device, the available write area information to the host in response to a first command output from the host; and
transmitting, by the host, a second command to the data storage device based on the available write area information, and performs, by the data storage device, a background operation for determining the first write area until receiving the second command.

18. A method of operating a data processing system including a host and a data storage device including a memory space which is formed of a plurality of multi-level memory cells, the method comprising:
sending, by the host, memory allocation information for data to be written to the data storage device, wherein the memory allocation information includes bandwidth information and data size information;
calculating, by the data storage device, a data size necessary to store the data using the data size information and the bandwidth information;
detecting, by the host, an available memory space of the memory space to write the data;
performing, by the host, one of a write operation on the available memory space according to the bandwidth information and a background operation on the memory space to secure more available memory space for a write operation, according to a detection result of the detecting of the available memory space,
wherein the bandwidth information indicates a rate at which the data is to be written to the data storage device.

19. The method of claim 18, wherein the available memory space is allocated using a plurality of combinations of a single level cell region and a multi-level cell region according to the bandwidth information, wherein the write operation includes at least one of a single-level cell write operation and a multi-level cell write operation, wherein the single-level cell write operation is performed on the single-level cell region and the multi-level cell write operation is performed on the multi-level cell region.

20. The method of claim 12, wherein if the detection result indicates a size of the available memory space is greater than the data size, the host performs the write operation, and if the detection result indicates a size of the available memory space is smaller than the data size, the host performs the background operation.

* * * * *